(No Model.)
R. GEORGI.
ARTIFICIAL FLOWER.
No. 322,367. Patented July 14, 1885.
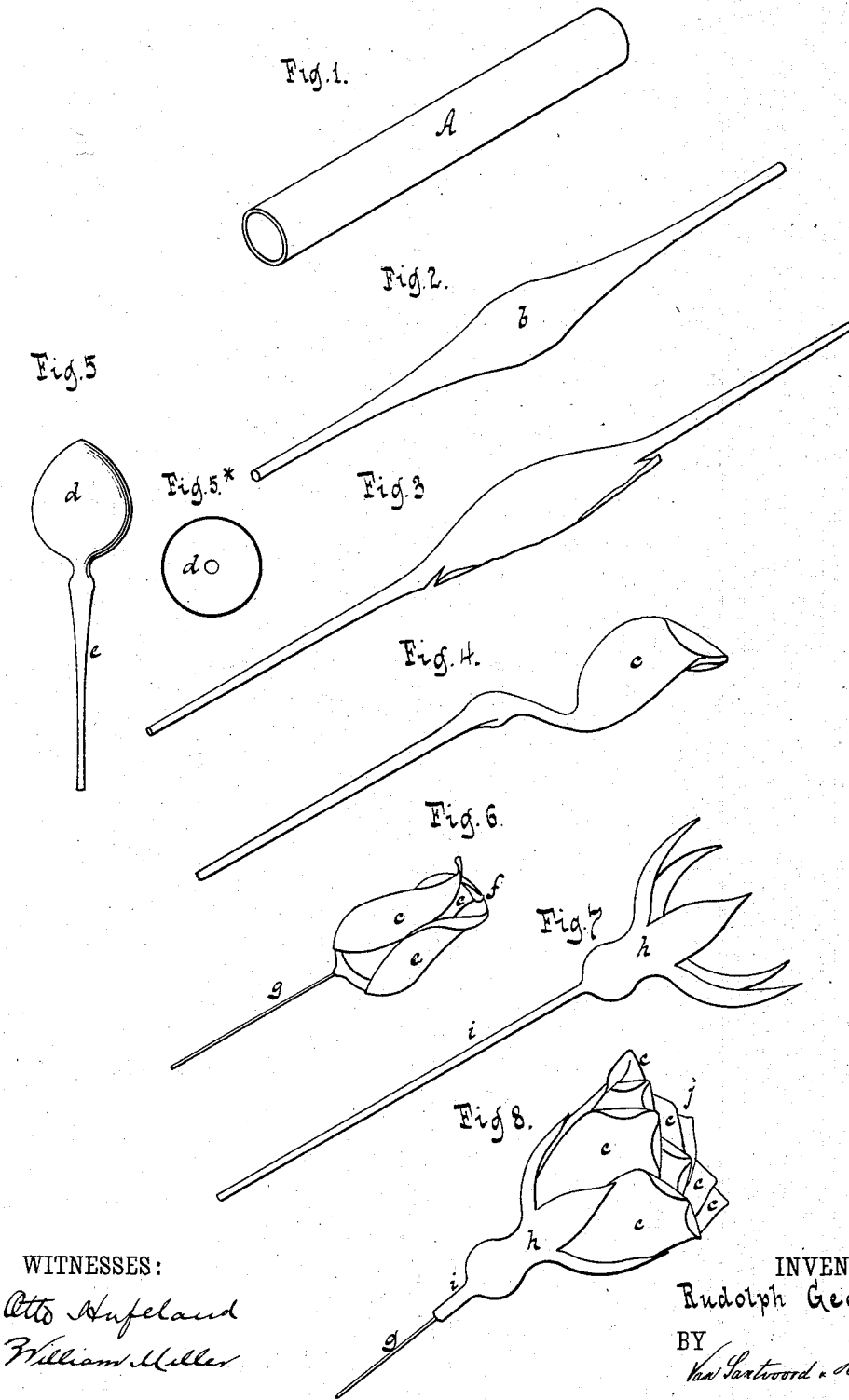

UNITED STATES PATENT OFFICE.

RUDOLF GEORGI, OF NEW YORK, ASSIGNOR TO GEORGE H. LAGES AND MARTHA GEORGI, BOTH OF BROOKLYN, NEW YORK.

ARTIFICIAL FLOWER.

Application filed November 10, 1884. (No model.) Patented in Germany February 28, 1880, No. 12,205, and in France March 18, 1880, No. 135,640.

SPECIFICATION forming part of Letters Patent No.322,367, dated July 14, 1885.

*To all whom it may concern:*

Be it known that I, RUDOLF GEORGI, a citizen of the German Empire, residing at New York, in the county and State of New York, have invented new and useful Improvements in the Manufacture of Artificial Flowers, (for which I have obtained a patent in Germany, No. 12,205, dated February 28, 1880, and also in France, No. 135,640, bearing date March 18, 1880,) of which the following is a specification.

This invention relates to an artificial flower the calyx and the leaves for the corolla of which are made separate of glass, then colored to correspond to the natural color of the flower to be imitated, and finally united by melting them together, or otherwise.

In the accompanying drawings I have illustrated the various steps required for the manufacture of a rose.

For this purpose I first take a plain glass tube, A, as illustrated in Figure 1, heat the same, and bring it into the form shown in Fig. 2. I then heat the bulb $b$ and press the same flat upon a metal plate. Then I heat one edge of this flattened bulb and blow the same out, thereby imparting to the same the form shown in Fig. 3. The article thus formed is again heated and its edges are turned over, thus forming a leaf, $c$, as shown in Fig. 4. After having finished a number of such leaves, which, however, must be of different sizes to correspond to the different sizes of the leaves of a rose, I color the same to correspond to the natural color of the flower to be imitated. I then take another glass tube, A, Fig. 1, and manipulate the same so as to form a hollow head, $d$, and a stem, $e$, as shown in Figs. 5 and 5*, and with the head $d$, I unite a series of the leaves $c$ until the inner portion, $f$, of the rose is completed, as shown in Fig. 6. I then melt off the glass stem $e$, Fig. 5, and replace the same by a wire stem, $g$, Fig. 6.

For the purpose of manufacturing the calyx $h$, Fig. 7, I take a glass tube, A, Fig. 1, bring the same into the form shown in Fig. 2, and then I cut the glass while soft with scissors, and turn the different parts over with pinchers until they assume the desired shape.

The calyx, after having been brought to the proper form, is then colored to correspond to the color of the natural calyx, and then I pass the wire stem $g$, Fig. 6, into the hollow glass stem $i$ of the calyx until the head $f$, Fig. 6, rests upon the bottom surface of said calyx, and then I unite the head $f$ and the calyx by melting them together. I then complete the corolla $j$, Fig. 8, by adding to the head $f$ a sufficient number of leaves $c$ of the required size, and finally I melt off the glass stem $i$.

Instead of melting the different parts together they can be united by a suitable cement.

I am aware that artificial flowers have been made by casting the corolla and the calyx together in one and the same mold; and I do not therefore claim, broadly, as my invention an artificial flower made of glass.

What I claim as new, and desire to secure by Letters Patent, is—

An artificial glass flower consisting of the calyx $h$, with its hollow stem $i$, and the head $f$, with its stem $g$, substantially as described.

In testimony whereof I have hereunto set my hand and seal in the presence of two subscribing witnesses.

RUDOLF GEORGI. [L. S.]

Witnesses:
W. HAUFF,
E. F. KASTENHUBER.